(12) United States Patent
Ko et al.

(10) Patent No.: US 7,733,897 B2
(45) Date of Patent: Jun. 8, 2010

(54) CHANNEL ALLOCATING METHOD FOR RANDOM ACCESS

(75) Inventors: You Chang Ko, Seoul (KR); Choong Ho Cho, Chungcheongnam-do (KR); Hyong Woo Lee, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 1076 days.

(21) Appl. No.: 11/142,872

(22) Filed: May 31, 2005

(65) Prior Publication Data

US 2006/0268772 A1 Nov. 30, 2006

(30) Foreign Application Priority Data

May 24, 2005 (KR) ...................... 10-2005-0043630

(51) Int. Cl.
*H04L 12/413* (2006.01)
(52) U.S. Cl. ....................... 370/447; 370/445; 370/461
(58) Field of Classification Search ................. 370/461, 370/462, 437, 447, 322, 341, 445
See application file for complete search history.

(56) References Cited

U.S. PATENT DOCUMENTS

| 6,535,547 B1 * | 3/2003 | Lyckegård et al. ......... 375/145 |
| 2003/0095528 A1 * | 5/2003 | Halton et al. ............... 370/342 |
| 2007/0189320 A1 * | 8/2007 | Wu et al. ..................... 370/437 |

FOREIGN PATENT DOCUMENTS

| JP | 2005-020772 | 1/2005 |
| KR | 10-2000-0015771 | 3/2000 |
| KR | 10-2001-0095977 | 11/2001 |
| KR | 10-2002-0078069 | 10/2002 |
| KR | 10-2004-0089937 | 10/2004 |
| WO | 2001-10157 | 2/2001 |

OTHER PUBLICATIONS

Van Houdt et al., "Analysis of an Identifier Splitting Algorithm Combined with Polling (ISAP) for Contention Resolution in a Wireless Access Network", Nov. 2000, IEEE Journal on Selected Areas in Communications, vol. 18, No. 11, pp. 2345-2355.*

* cited by examiner

*Primary Examiner*—Jason E Mattis
(74) *Attorney, Agent, or Firm*—Lee, Hong, Degerman, Kang & Waimey

(57) ABSTRACT

A channel allocating method for random access is disclosed, which is suitable for allocation of uplink RACH in a radio access network and by which random access processing performance in a radio access network is enhanced using RACH of new structure. The present invention includes the steps of setting up a channel area ($I_c$) dedicated for new access attempt among random access channels of a prescribed frame (t) and allowing a mobile terminal to attempt access to an access point via a prescribed random access channel corresponding to the channel area ($I_c$).

6 Claims, 3 Drawing Sheets

CHANNEL ALLOCATING METHOD FOR RANDOM ACCESS

This application claims the benefit of the Korean Patent Application No. P2005-43630, filed on May 24, 2005, which is hereby incorporated by reference as if fully set forth herein.

BACKGROUND OF THE INVENTION

1. Field of the Invention

The present invention relates to a channel allocating method for random access in uplink of a radio access network.

2. Discussion of the Related Art

Generally, a radio access network according to a related art consists of an access point (hereinafter abbreviated AP) and a mobile terminal (hereinafter abbreviated MT) attempting to access the AP via an air interface. In this case, FDMA, TDMA, CDMA, OFDMA, OFDMA-CDMA or the like can be used as the air interface.

In case that the MT attempts to transmit data in uplink (from MT to AP), an uplink resource needs to be allocated to the MT. To have the uplink resource allocated, the MT transmits a resource request packet (hereinafter abbreviated RR) to the AP via a random access channel (hereinafter abbreviated RACH).

Each MT that requests the uplink resource transmits the RR packet via RACH each frame until receiving a response of access success or failure from the AP. In this case, the frame is a medium access control 9 hereinafter abbreviated MAC) frame of a limited count.

Meanwhile, a result of an access attempt, i.e., the access success or failure (collision) is notified to the corresponding MT via an access feedback channel (hereinafter abbreviated AFCH) among downlink (from AP to MT) channels of a next frame.

Collision frequently occurs in the above-explained random access process since at least one or more MTs make access via the same RACH. Each of the MTs having the collision occurrences in the random access process should retransmit the RR packet to the AP. In this case, there are three RACH allocating methods according to the AP's scheme of processing the retransmitted RR packet as follows.

1. First RACH Allocating Method that AP Fixes the Count of RACH to Random 'n', [1]: HIPERLAN Type2; Data Link Control (DLC) Layer; Part 1: Basic Data Transport Functions, Broadband Radio Access Networks (BRAN), ETSI TS 101 761-1 V1.3.1, December (2001).

If a collision occurs when an MT transmits an RR packet to an AP via RACH, a window size (window size=frame count) is determined by binary exponential back-off algorithm according to the count of collision occurrences. The MT stands by during the determined window size and then retries a random access. Namely, after the duration of the frames of which count have been determined by the algorithm, the MT retransmits the RR packet to the AP via RACH.

Meanwhile, the random access via RACH is controlled by a contention window (hereinafter abbreviated CW) managed by each MT.

Each MT determines a size of CW by a retransmission count (a) of the RR packet according to the following manner.

First of all, the retransmission count in initial attempt is '0'. Hence, $CW_0$ has a size corresponding to a RACH count (n) of a current frame.

On the other hand, the retransmission count (a) in retransmission has a value equal to or greater than '1'. Hence, the size of CW becomes 256 ($2a \geq 256$), 2a ($n < 2a \leq 256$) or n ($n \geq 2a$) according to the retransmission count (a) of the RR packet for access re-attempt.

Meanwhile, for the control of random access via RACH, the MT determines the size of CW using the retransmission count (a) of the RR packet and then selects a uniform distribution random variable (r) between the CW sizes according to '1' and the retransmission count (a). In this case, the selected 'r' becomes the number of RACH the MT attempts to access.

In the first allocating method, the count (n) of RACH in each frame is not changed.

2. Second Method of Allocating RACH Dynamically Using Split Algorithm:

[2] Peter Mathys and Philippe Flajolet, "Q-ary Collision Resolution Algorithm in Radio-Access Systems with Free or Blocked Channel Access", IEEE Transactions on Information Theory, Vol. IT-31, No.2, March 1985;

[3] D. Petra, A. Kramling, and A. Hettich, "MAC Protocol for Wireless ATM: Contention Free versus Contention Based Transmission of Reservation Requests", 7th IEEE PIMRC, 1996; and

[4] Benny Van Hooudt and Chris Blondia, "Analysis if an Identifier Splitting Algorithm Combined with Polling (ISAP) for Contention Resolution in a Wireless Access network", IEEE Journal on Selected Area in Communications, Vol.18, No.11, November 2000.

FIG. 1 is a diagram of an example of allocation of random access channel (RACH) according to a related art, in which RACHs are allocated dynamically using split algorithm.

Referring to FIG. 1, after MTs of a set $Q_i$ have attempted random accesses via RACHs of a frame t, a contention resolution period corresponding to prescribed frames following the frame t is given to MTs of collision occurrence among the MTs of the set $Q_i$. In this case, '$Q_i$' represents a set of MTs having made random access to a frame i.

In the second allocating method, the count of RACH differs in each frame.

And, the second allocating method is explained in detail as follows.

First of all, MTs of a set $Q_t$ having attempted random access via transmission of RR packet in the frame t are divided into MTs succeeding in access and MTs failing (colliding) in access.

The MTs (succeeding in access) having collision occurrence of the transmitted RR packets among the MTs of $Q_t$ acquire uplink resources from AP, i.e., prescribed channels.

In contrast, for the MTs (failing in access0 having the collision occurrence of the transmitted RR packets among the MTs of $Q_t$, a contention resolution period begins in the AP.

Meanwhile, the RACHs of the frame t, in which the access-failing MTs have transmitted the RR packets, i.e., the RACHs having the collision occurrence are split into m ($\geq 2$) in a next frame (t+1). For instance, if collisions occur in RACHs of c, the count of RACHs in the frame (t=1) becomes (c×m).

Hence, the MTs of 'j ($\geq 2$)' having the collision occurrence in attempting the random access to a random $k^{th}$ RACH in the frame t re-attempt random access via one of 'm' RACHs from which the $k^{th}$ RACH was split in a next frame (t+1). Namely, the $k^{th}$ RACH of the frame t is split into 'm' in the next frame (k+1) and the RR packet is transmitted via one of the m-split RACHs in the next frame (t+1).

Yet, if collision occurs in c' RACHs in the frame (t+1), the RACH count in a frame (t+2) becomes c'×m.

Therefore, 'j' MTs having the collision occurrence in attempting the random access in the frame t can send RR packets after a frame p($\geq 1$).

In the above-explained second allocating method, throughput (=count of RACHs succeeding in access/total count of RACHs allocated to one frame) becomes higher than that of the first allocating method. And, the retransmission time of the second allocating method for the MTs having the collision occurrence is shorter than that of the first allocating method.

3. Third Method of Allocating RACH Dynamically by Algorithm of Equation 1, [5]

[5] Gyung-Ho Hwang and Dong-Ho Cho, "Adaptive Random Channel Allocation Scheme in HIPERLAN Type2", IEEE Communications Letters, Vol.6, No.1 January 2002.

$$r(t+1)=r(t)+\alpha(N_f(t)-N_s(t))(1-I_{idle}(t))-I_{idle}(t) \quad \text{[Equation 1]}$$

r(t): Count of RACHs allocated to frame t

α weight $N_f(t)$: Count of RACHs colliding in random access in a frame t $N_s(t)$: Count of RACHs succeeding in access in a frame t $I_{idle}(t)$: '1' if no access to RACH in a frame t, '0' if not The RACHs of the frame t are classified according to the result of the random access attempt of MTs, i.e., according to the success or failure (collision) of the random access.

In the third method, new RACHs amounting to the count of RACHs having the collision occurrence among total RACHs of the frame t are added to the frame (t+1). On the contrary, RACHs amounting to the count of RACHs succeeding in access among total RACHs are deleted from the frame (t+1).

For instance, if the count r(t) of RACHs of frame t is 10, if collisions occur in three of the RACHs, if five of the RACHs succeed in access, and if the rest two of the RACHs did not attempt random access, a count r(+1) of RACHs that will be dynamically allocated to the frame (t+1) is '10+3−5=8'.

Meanwhile, a minimum count of RACHS should be at least 1 each frame. Hence, if the count r(t+1) of RACHs of the frame (t+1) is smaller than 1, it becomes 'r(t+1)=1'.

If there was no access attempt to RACHs of the frame t, he count r(t+1) of RACHs of the frame (t+1) becomes 'r(t)−1'.

And, the MTs having the collision occurrence in RR packet transmission determine the size of CW by the retransmission count (a) of the RR packets like the first allocating method and then retransmit the RR packets.

In the third allocating method, the count of RACHs is variable each frame. And, throughput (=count of RACHs succeeding in access/total count of RACHs allocated to one frame) becomes similar to or slightly higher than that of the first allocating method. Yet, the retransmission time of the third allocating method for the MTs having the collision occurrence is longer than the retransmission time of the first allocating method.

However, the related art allocating methods have the following problems or disadvantages.

In the first allocating method, since the count of the RACHs is the same in each frame, in case that the MTs attempting the random access are in a fluidly situation, waste or shortage of channel resources may be brought about. Hence the throughput (=count of RACHs succeeding in access/total count of RACHs allocated to one frame) of the first allocating method is relatively lower than that of another allocating method. In case that the count of the RACHs is set excessively in a prescribed frame, it results in the waste of radio resources. In contrast, if the count of the RACHs is set lower than necessary in a prescribed frame, collisions of the MTs for the access attempt are raised to elongate the overall access time.

And, since the binary exponential back-off algorithm is used as the algorithm for the retransmission of the RR packets, unfair access opportunities are provided to the MTs having the collision occurrence and retransmission delay is considerable.

Moreover, since each of the MTs needs to calculate the window size (=frame count) necessary for the re-attempt of the random access using the binary exponential back-off algorithm, complexity in MT implementation is raised.

In the second allocating method, as the RACH is dynamically allocated using the split algorithm, the MTs having the collision occurrence in attempting the random access succeed in retransmission of the RR packets fast through a prescribed p(>1) frame. Yet, the transmission of RR packet for new random access is not allowed during the time for the retransmission of the RR packet (contention resolution period). Namely, random access of new MTs is not allowed for the n frames corresponding to the period for resolving the collisions occurring in the frame t in FIG. 1 but new random access is allowed in a frame (t+n+1). So, the access delay for new MTs is brought about.

In the third allocating method, since the RACH count of each frame is changed, the resources can be used more efficiently than those of the first allocating method. Yet, since each MT uses the binary exponential back-off algorithm like the first allocating method, the same problem of the second allocating method is brought about.

SUMMARY OF THE INVENTION

Accordingly, the present invention is directed to a channel allocating method for random access that substantially obviates one or more problems due to limitations and disadvantages of the related art.

An object of the present invention is to provide a channel allocating method for random access, which is suitable for allocation of uplink RACH in a radio access network.

Another object of the present invention is to provide a channel allocating method for random access, by which random access processing performance in a radio access network is enhanced using RACH of new structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a channel allocating method for random access according to the present invention includes the steps of setting up a channel a ($I_c$) dedicated for new access attempt among random access channels of a prescribed frame (t) and allowing a mobile terminal to attempt access to an access point via a prescribed random access channel corresponding to the channel area ($I_c$).

Preferably, the channel allocating method further includes a step of transmitting information of the channel area ($I_c$) via a broadcast channel to a plurality of mobile terminals including the mobile terminal from the access point. In this case, the information is a count of the random access channels corresponding to the channel area ($I_c$) or an index of the random access channels corresponding to the channel area ($I_c$).

Preferably, the channel allocating method further includes a step of setting up a rest of the random access channels of the frame (t) except the channel area ($I_c$) as a channel area ($R_c$) to be allocated for access re-attempt.

Preferably, the channel allocating method further includes a step of if the mobile terminal fails in access attempt in the frame (t), reattempting the access to the access point via a channel area ($R_c'$) corresponding to a rest of random access channels corresponding to a frame (t+1) next to the frame (t) except a channel area ($I_c'$) dedicated for new access attempt among the random access channels corresponding to the frame (t+1). In this case, the random access channel of the frame (t) filing in the access attempt is split into m($\geq 2$) in the next frame (t+1). Moreover, if it is unable to allocate the channel area ($R_c'$) for the access reattempt to the mobile terminal, the random access channel of a frame (t+1+$\delta$) delayed by a prescribed time $\delta$ is allocated to the mobile terminal. In this case, the random access channel of the frame (t+1+$\delta$) corresponds to a channel area to be dedicated for the new access attempt among random access channels of the frame (t+1+$\delta$).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
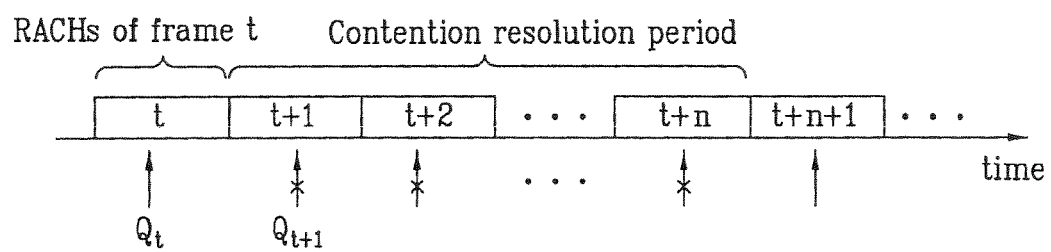
FIG. 1 is a diagram of an example of allocation of random access channel (RACH) according to a related art.
Figure 2:
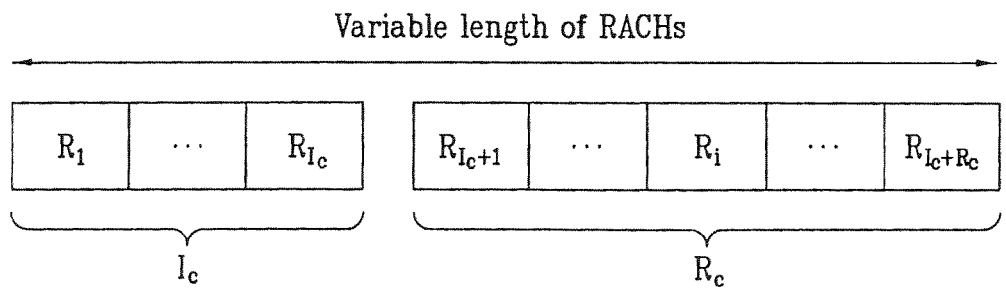
FIG. 2 is a structural diagram of a random access channel (RACH) according to the present invention.

FIG. 2 is a structural diagram of a random access channel (RACH) according to the present invention, in which the structure is provided for resolving the access delay for MTs newly attempting random access in a method of allocating RACH dynamically using split algorithm.

Referring to FIG. 2, RACH according to the present invention is divided into variable $I_c$ and $R_c$.

$I_c(\geq 1)$ is an area exclusively allocated to MTS that newly attempt access to AP, and $R_c(\geq 0)$ is an area for contention resolution of MTs having collision occurrence in access attempt. So, the MTs newly attempting random access to the AP transmit RR packets via RACH corresponding to $I_c(\geq 1)$. In FIG. 2, 'R' indicates RACH.

Namely, RACHs of a frame are previously set in a manner of being divided into the channel area $I_c(\geq 1)$ that will be exclusively allocated to the MTs newly attempting access to the AP and the channel area $R_c(\geq 0)$ that will be allocated to MTs re-attempting access for contention resolution according to access failure.

Meanwhile, $I_c$ is dynamically varied according to a traffic situation of each AP. And, the area $R_c$ for the contention resolution in the frame t is determined by the count of MTs having the collision occurrence in a frame (t−1) using the split algorithm.

Explained in the following is an RACH allocating procedure that employs the above-explained RACH structure.

Figure 3:
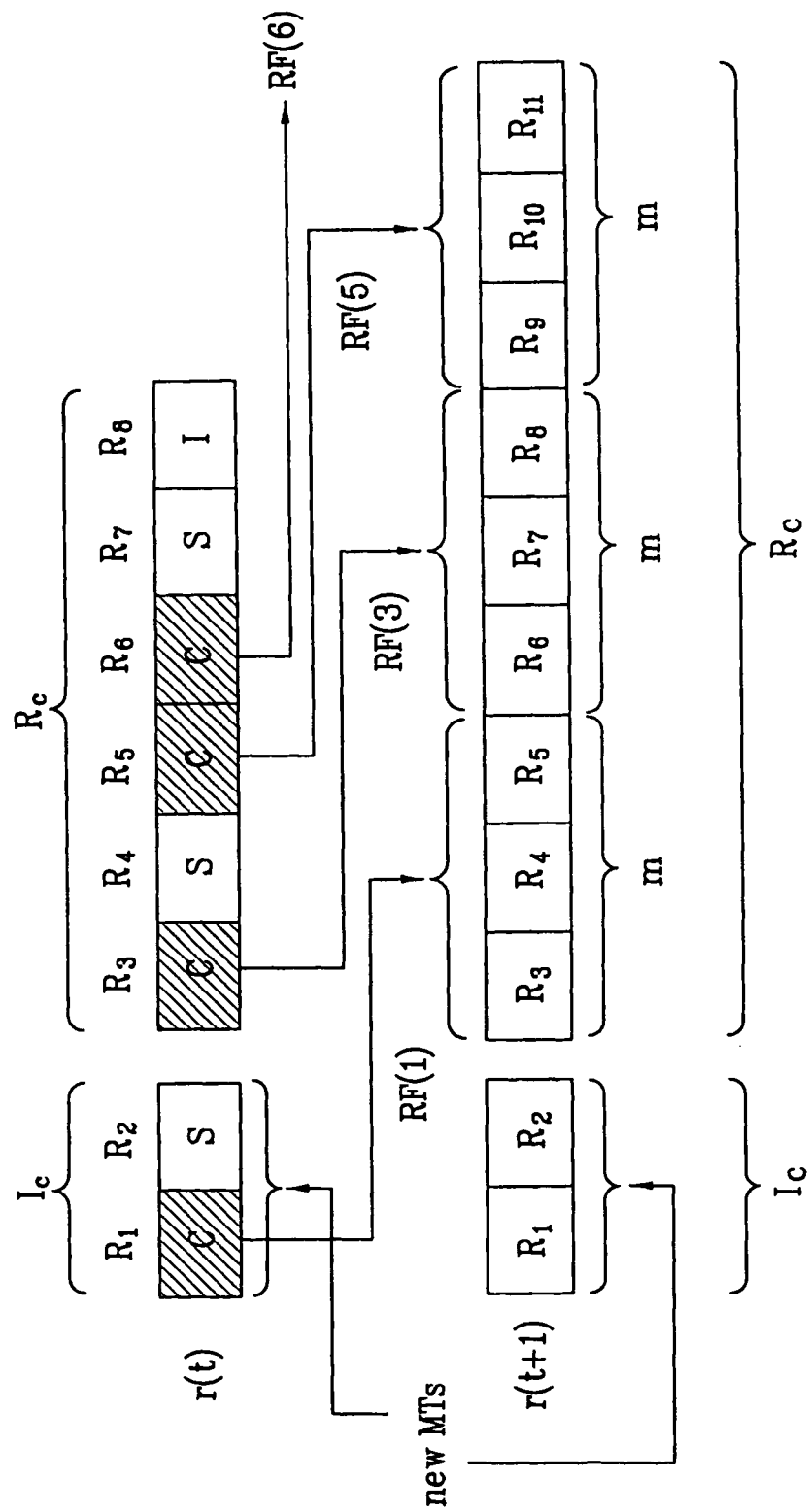
FIG. 3 is a diagram for explaining an allocation procedure of a random access channel (RACH) according to one embodiment of the present invention.

FIG. 3 is a diagram for explaining an allocation procedure of a random access channel (RACH) according to one embodiment of the present invention.

Referring to FIG. 3, in a structure of RACH in FIG. 3, $I_c=2$ and a split factor is 3. And, r(t) is a count of RACHs allocated to a frame t.

In FIG. 3, 'C' indicates RACHs failing (colliding) in access, 'S' indicates RACHs succeeding in access, and 'I' indicates RACH having no random access attempt. And, $R_x$ is an index of RACH. Hence, "$1 \leq x \leq 8$" in the frame t and "$1 \leq x \leq 11$" in a frame (t+1).

The split factor is a factor for deciding how many RACHs will be split in a next frame from the RACH having the collision occurrence in a prescribed frame.

Hence, the RACH having the collision occurrence in a previous frame t is split into three RACHs in a next frame (t+1) according to 'split factor=3'.

And, FIG. 3 shows a case that a count $R_{MAX}$ of RACHs per frame which can be maximally set by an AP is 11.

In case that collisions occur in total four RACHs among eight RACHs of the frame t, each of the four RACHs is split into three RACHs in the next frame (t+1) by the split algorithm for retransmission of RR packets.

In other words, MTs having attempted access via RACH of an index $R_1$ in a frame t re-attempt access through one RACH of indexes $R_3$, $R_4$ and $R_5$ in a frame (t+1).

And, MTs having attempted access via RACH of an index $R_3$ in a frame t re-attempt access through one RACH of indexes $R_6$, $R_7$ and $R_8$ in a frame (t+1).

Moreover, MTs having attempted access via RACH of an index $R_5$ in a frame t re-attempt access through one RACH of indexes $R_9$, $R_{10}$ and $R_{11}$ in a frame (t+1).

Yet, RACH corresponding to an $R_c$ area of a frame (t+1) cannot be allocated to MTs having attempted access via RACH of an index $R_6$ in a frame t. This is because the count $R_{MAX}$ of RACHs per frame which can be maximally set by the AP is 11. To prepare for the case that RACHs corresponding to the area $R_c$ of the frame (t+1) cannot be allocated to the entire MTs having collision occurrence in the frame t since a size (count) of total RACHs of the frame (t+1) that will be generated from the split of RACHs having the collision occurrence exceeds $R_{MAX}$, the present invention allows the MTs, which failed in having RACHs, which correspond to the $R_c$ area of the frame (t+1) among the entire MTs having the collision occurrence in the frame t, allocated thereto, to attempt random access in a frame (t+1+$\delta$) delayed by a prescribed time (frame). Specifically, one of RACHs corresponding to the $I_c$ area that is a dedicated allocation area of MTs newly attempting access to the AP among RACHs of the frame (t+1+$\delta$) is allocated to the MTs. In this case, it is $\delta \geq 1$ and '$\delta$' is a delay time of frame unit. And, '$\delta$' is adjustable to an arbitrary value suitable for a traffic situation in the AP.

Therefore, the MTs having attempted access via the RACH of the index $R_6$ in the frame t re-attempt access via the RACH corresponding to the area $I_c$ among RACHs of the frame (t+1+$\delta$).

Meanwhile, in FIG. 3, a function RF(i) for splitting RACHs having the collision occurrence in the previous frame t according to the split factor in the next frame (t+1) is defined. In this case, 'i' corresponds to 'x' of the index Rx of the RACH in the frame t.

First of all, for new access attempt, RACHs ($R_1, R_2, \ldots, R_{1c}$) corresponding to the area $I_c$ of the frame are allocated. Hence, for the new access attempt, RACHs from $R_1$ to $R_{Ic}$ of the frame are allocated.

The function RF(i) is defined as follows.

When $I_c + m(\theta_i + 1) \leq R_{MAX}$, $RF(i) = [R_{Ic+m\theta_i+1}, R_{Ic+m(\theta_i+1)}]$, or when $I_c + m(\theta_i + 1) < R_{MAX}$, RACHs $[R_1, R_{Ic}]$ in the frame (t+1+δ) after a prescribed time (frame) delay, i.e., RACHs from $R_1$ to $R_{Ic}$ of the frame (t+1+δ) are allocated.

In this case, $\theta_i$ is a count of RACHs having collision occurrence among RACHs below $i^{th}$ in the frame t. For instance, $\theta_5$ in FIG. 3 is 2 ($R_1$ and $R_3$).

An example of an RACH allocation procedure according to the present invention is explained as follows.

Figure 4:
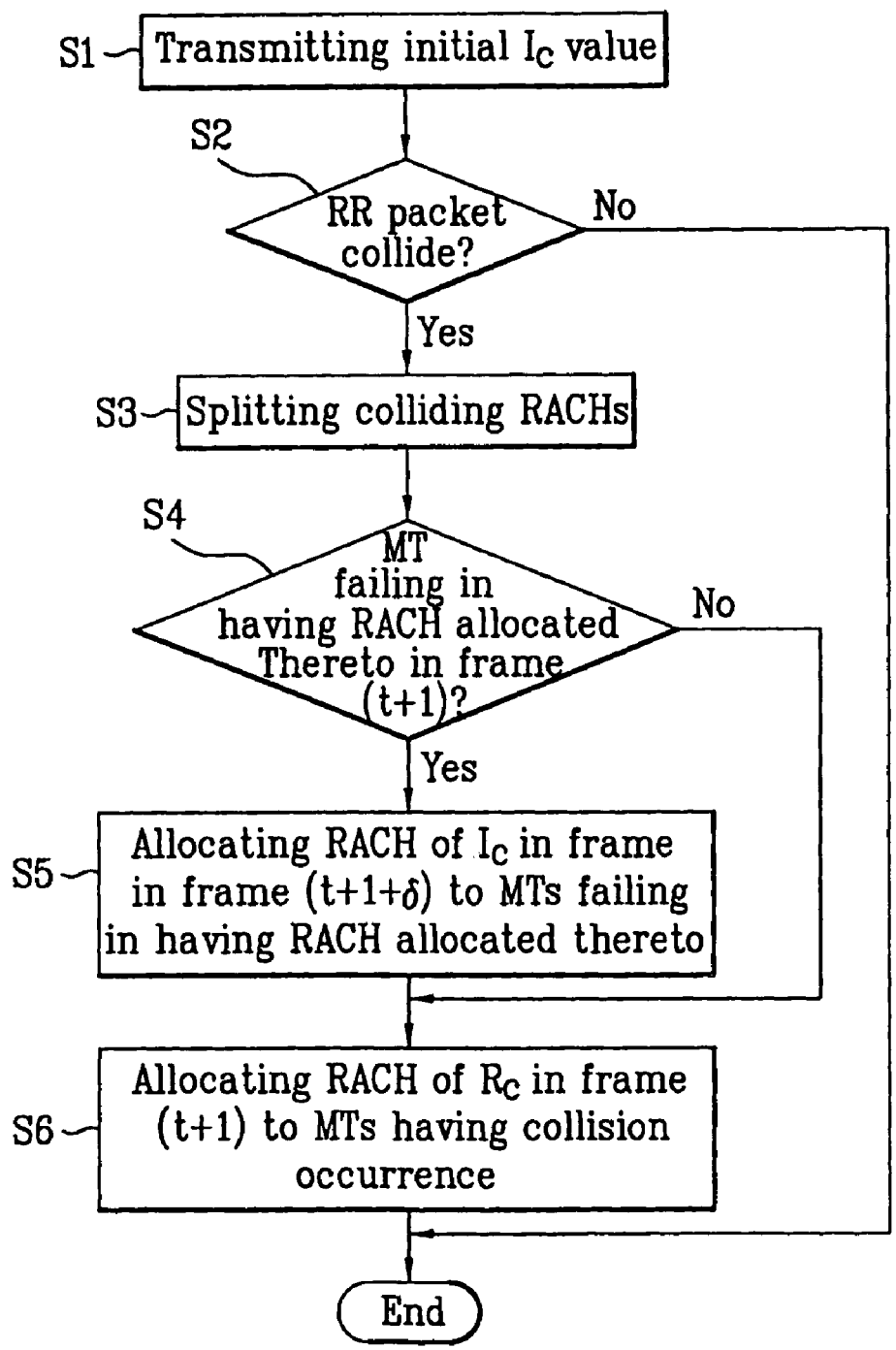
FIG. 4 is a flowchart of an allocation procedure of a random access channel (RACH) according to one embodiment of the present invention.

FIG. 4 is a flowchart of an allocation procedure of a random access channel (RACH) according to one embodiment of the present invention.

Referring to FIG. 4, a value of an initial $I_c$ is notified to all MTs. Specifically, an AP transmits the value of the initial $I_c$ to the entire MTs via a broadcast channel (hereinafter abbreviated BCH) (S1). Hence, the MTs transmit RR packets for initial random access attempt via RACH corresponding to an $I_c$ area of a frame t.

In this case, the value of $I_c$ is a count of RACHs that will be exclusively allocated for new access attempt among RACHs of the frame t. Or, the value of $I_c$ is an index of RACHs that will be exclusively allocated for new access attempt among RACHs of the frame t.

After there was the random access attempt via the RACH corresponding to the $I_c$ area of the MTs, it is checked whether a collision of RR packets occurs in the access attempt (S2). In other words, it is checked whether there exists an RACH having collision occurrence among the RACHs via which the MTs have transmitted the RR packets in the random access.

In case that the collision of the RR packets occurs in the access attempt, the AP splits the RACHs having the collision occurrence from a next frame (t+1) according to a split factor (S3).

Subsequently, it is checked whether there exist MTs failing in being provided with RACHs corresponding to an $R_c$ area of the frame (t+1) among the entire MTs having the collision occurrence in the frame t, because a size (count) of the entire RACHs of the frame (t+1) that will be generated from the split of the RACHs exceeds $R_{MAX}$ (S4).

As the size (count) of the entire RACHs of the frame (t+1) that will be generated from the split of the RACHs exceeds $R_{MAX}$, if there exist the MTs failing in being provide with RACHs corresponding to the $R_c$ area of the frame (t+1), the AP allocates one of the RACHs corresponding to the $I_c$ area of a frame (t+1+δ) delayed by a prescribed time (frame) to the corresponding MTs (S5).

On the other hand, as the size (count) of the entire RACHs of the frame (t+1) that will be generated from the split of the RACHs does not exceed $R_{MAX}$, if there exist no MTs failing in being provided with RACHs corresponding to the $R_c$ area of the frame (t+1), the AP allocates the RACHs corresponding to the $R_c$ area of the frame (t+1) to the MTs having the collision occurrence in the frame t (S6).

Meanwhile, to allocate RACHs for random access re-attempt, the AP feeds back allocation information for re-attempt of random access to the MTs having the collision occurrence of the RR packets in access attempt.

The feedback information is to inform that the MTs should make re-access via RACHs within a prescribed range in the frame (t+1). In the present invention, it is preferable that the feedback information is the index of RACHs corresponding to the $R_c$ area of the frame (t+1) after the split. Optionally, it is preferable that the feedback information is the index of RACHs corresponding to the $I_c$ area of the frame (t+1+δ).

An average access delay ($\overline{D}$) in attempting random access to the AP from MTs can be found in the following manner.

First of all, D(n) is a time taken for n MTs to entirely succeed in random access to the AP in uplink, i.e., a frame count.

D(n) can be expressed by Equation 2.

$$D(n) = \sum_{s_1 + \ldots + s_m = n} \left[ \alpha(s_1, s_2, \ldots, s_m; n) \cdot \left\{ n + \sum_{i=1}^{m} D(s_i) \right\} \right]. \quad \{\text{Equation 2}\}$$

In Equation 2, $\alpha(s_1, s_2, \ldots, s_m; n)$ is a multinomial probability function, which indicates how n RR packets transmitted from n MTs are distributed on m-split RACHs to be transmitted. Namely, it represents the probability that $S_1$ RR packets, $S_2$ RR packets and $S_m$ RR packets will be transmitted via $1^{st}$ RACH, $2^{nd}$ RACH and $m^{th}$ RACH, respectively. Meanwhile, $\alpha(s_1, s_2, \ldots, s_m; n)$ can be expressed by Equation 3 according to definition.

$$\alpha(s_1, s_2, \ldots, s_m; n) = \frac{n!}{s_1! \cdot s_2! \cdot \ldots \cdot s_m!} \cdot (p_1^{s_1} \cdot p_2^{s_2} \cdot \ldots \cdot p_m^{s_m}) \quad [\text{Equation 3}]$$

$$= \frac{n! \cdot m^{-n}}{s_1! \cdot s_2! \cdot \ldots \cdot s_m!}$$

In Equation 3, the '$p_i$' is a probability 1/m that the RR packet will be transmitted via an $i^{th}$ RACH among m RACHs.

Equation 2 is arranged for D(n) into Equation 4 as follows.

$$D(n) = \frac{n + \sum_{0 \leq s_1 \leq n-1, \ldots, 0 \leq s_m \leq n-1} \left[ \begin{array}{c} \alpha(s_1, s_2, \ldots, s_m; n) \cdot \\ \left\{ \sum_{i=1}^{m} D(s_i) \right\} \end{array} \right]}{1 - m^{-n+1}}, \quad [\text{Equation 4}]$$

for $n \geq 2$.

An average access delay $\overline{D}$ taken to acquire an uplink resource (access success) by attempting a first random access using Equation 4 can be expressed by Equation 5 as follows.

$$\overline{D} = \frac{I_c}{\lambda_i} \sum_{i=0}^{\infty} D(i) \cdot P(i), \quad [\text{Equation 5}]$$

where $p(i) = e^{\frac{\lambda_i}{I_c}} \cdot \frac{\left(\frac{\lambda_i}{I_c}\right)^i}{i!}$, $i = 0, 1, 2, \ldots$ In Equation 5, p(i) is a probability (represented by Poisson Distribution) that the RR packet will be transmitted via one of RACHs corresponding to the $I_c$ area. And, $\lambda_i$ is a generation rate of RR packet in viewpoint of AP.

Meanwhile, a throughput ρ of the AP for random access of MT according to the present invention can be found in the following manner.

N(n) is a time taken for n MTs to entirely succeed in random access to the AP in uplink, i.e., a frame count. N(n) can be expressed by Equation 6.

$$N(n) = \sum \left[ \alpha(s_1, s_2, \ldots, s_m; n) \cdot \left\{ m + \sum_{i=1}^{m} N(s_i) \right\} \right]. \quad \text{[Equation 6]}$$

Equation 6 is recursively arranged for N(n) to turn into Equation 7.

$$N(n) = \frac{m + \sum_{0 \leq s_1 \leq n-1, \ldots, 0 \leq s_m \leq n-1} \left[ \alpha(s_1, s_2, \ldots, s_m; n) \cdot \left\{ \sum_{i=1}^{m} N(s_i) \right\} \right]}{1 - m^{-n+1}}. \quad \text{[Equation 7]}$$

If $\overline{N}$ is an average of N(n), the $\overline{N}$ can be represented by Equation 8.

$$\overline{N} = I_c \cdot \left( 1 + \sum_{i=0}^{\infty} N(i) \cdot P(i) \right), \quad \text{[Equation 8]}$$

where $p(i) = e^{\frac{\lambda_i}{I_c}} \cdot \frac{\left(\frac{\lambda_i}{I_c}\right)^i}{i!}$, $i = 0, 1, 2, \ldots$ So, the throughput ρ of the AP for random access of MT according to the present invention can be expressed by a rate of the count of RACHs succeeding in the random access over the total count of the allocated RACHs, which is found by Equation 9.

$$\rho = \frac{\text{total number of successful access attempts}}{\text{total number of allocated } RACHs} \quad \text{[Equation 9]}$$

$$= \frac{\lambda_t}{\text{mean assigned number of } RACHs}$$

$$= \frac{\lambda_t}{I_c \cdot \left(1 + \sum_{i=0}^{\infty} N(i) \cdot P(i)\right)}.$$

Accordingly, by providing the $I_c$ area dedicated for the MTs newly attempting the random access to the AP, the present invention supports the random access of new MTs via the Ic area each frame regardless of the contention resolution period.

Meanwhile, by varying the size (count of RACHs) of the area $I_c (\geq 1)$ dedicated to the MTs newly attempting access to the AP, the throughput of the AP for the random access of MT is not lowered. Moreover, in the present invention, access delay and access variation are reduced.

The reduction of the access delay, and more particularly, the reduction of the access variance is essential to processing the real-time multimedia traffic later. If the present invention is applied to processing the real-time multimedia traffic, QoS (quality of service) in user's aspect can be enhanced more.

Moreover, the present invention uses the RR packet retransmission algorithm relatively simpler than the binary exponential back-off algorithm used by MTs for contention resolution, thereby lowering the complexity of MT.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A channel allocating method for random access, comprising:
    setting up a first type channel area ($I_c$) dedicated for a new access attempt among random access channels of a prescribed frame (t);
    allowing a specific mobile terminal to attempt a new access to an access point via a prescribed random access channel within the first type channel area ($I_c$),
    wherein the first type channel area ($I_c$) is not used for an access re-attempt; and
    allowing the specific mobile terminal to re-attempt the access to the access point via a second type channel area ($R_c'$) set up to be used for the access re-attempt at a frame (t+1) next to the frame (t) except a first type channel area ($I_c'$) dedicated for a new access attempt among the random access channels at the frame (t+1) if the specific mobile terminal fails in the access attempt at frame (t),
    wherein a random access channel of a frame (t+1+δ) delayed by a prescribed time δ is allocated to the specific mobile terminal which fails in the access attempt at the frame (t) if the second type channel area ($R_c'$) at frame (t+1) cannot be allocated to the specific mobile terminal for the access re-attempt, and
    wherein the random access channel of the frame (t+1+δ) corresponds to a first type channel area ($I_c''$) to be dedicated for the new access attempt among random access channels at the frame (t+1+δ).

2. The channel allocating method of claim 1, further comprising
    transmitting information of the first type channel area ($I_c$) via a broadcast channel to a plurality of mobile terminals including the specific mobile terminal from the access point.

3. The channel allocating method of claim 2, wherein the information is a count of the random access channels within the first type channel area ($I_c$).

4. The channel allocating method of claim 2, wherein the information is an index of the random access channels within the first type channel area ($I_c$).

5. The channel allocating method of claim 1, further comprising
    setting up the random access channels of the frame (t) except the first type channel area ($I_c$) as a second type channel area ($R_c$) to be used for the access re-attempt.

6. The channel allocating method of claim 1, wherein each of the random access channels of the frame (t) via which the specific mobile terminal fails in the access attempt at the frame (t) is split into "m" random access channels in the next frame (t+1),
    wherein "m" is an integer equal to or greater than 2.

* * * * *